(12) United States Patent
Yamanaka et al.

(10) Patent No.: US 10,526,690 B2
(45) Date of Patent: *Jan. 7, 2020

(54) HIGH-STRENGTH HOT-DIP GALVANIZED STEEL SHEET

(71) Applicant: Nippon Steel & Sumitomo Metal Corporation, Tokyo (JP)

(72) Inventors: Shintaro Yamanaka, Tokyo (JP); Soshi Fujita, Tokyo (JP); Koichi Sato, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 865 days.

This patent is subject to a terminal disclaimer.

(21) Appl. No.: 14/348,161

(22) PCT Filed: Sep. 28, 2012

(86) PCT No.: PCT/JP2012/075203
§ 371 (c)(1),
(2) Date: Mar. 28, 2014

(87) PCT Pub. No.: WO2013/047812
PCT Pub. Date: Apr. 4, 2013

(65) Prior Publication Data
US 2014/0255724 A1    Sep. 11, 2014

(30) Foreign Application Priority Data

Sep. 30, 2011    (JP) .................. 2011-217146

(51) Int. Cl.
C23C 2/02    (2006.01)
C21D 8/02    (2006.01)
C23C 2/12    (2006.01)

(52) U.S. Cl.
CPC .............. C23C 2/02 (2013.01); C21D 8/0263 (2013.01); C23C 2/12 (2013.01); *Y10T 428/12799* (2015.01)

(58) Field of Classification Search
None
See application file for complete search history.

(56) References Cited

U.S. PATENT DOCUMENTS

2009/0297387 A1    12/2009    Chin et al.
2010/0304183 A1*   12/2010    Honda .................. C21D 9/46
                                              428/659
2011/0162762 A1*   7/2011     Matsuda .............. C21D 1/20
                                              148/533

FOREIGN PATENT DOCUMENTS

EP    0 882 810     12/1998
JP    04-285149     10/1992
(Continued)

OTHER PUBLICATIONS

JP 2010-018856 machine translation.*
(Continued)

Primary Examiner — Paul A Wartalowicz
Assistant Examiner — Stephani Hill
(74) Attorney, Agent, or Firm — Birch, Stewart, Kolasch & Birch, LLP

(57) ABSTRACT

A high-strength hot-dip galvanized steel sheet that is a steel sheet that includes major components and that contains at least 40 vol. % the sum of bainite and martensite, 8-60 vol. % retained austenite, and less than 40 vol. % ferrite, with the remainder comprising an incidental structure. The hot-dip galvanized steel sheet has, at the interface between the deposit layer formed by hot-dip galvanization and the base steel sheet, an intermetallic compound constituted of Fe, Al, Zn, and incidental impurities and having an average thickness of 0.1-2 μm, the intermetallic compound having a (Continued)

crystal grain diameter of 0.01-1 μm. After the deposit layer formed by hot-dip galvanization was removed, the surface of the base steel sheet has an arithmetic average roughness Ra of 0.1-2.0 μm and gives a roughness curve in which the contour elements have an average length RSm of 5-300 μm.

4 Claims, 2 Drawing Sheets

(56) References Cited

FOREIGN PATENT DOCUMENTS

| JP | 06-57337 | | 3/1994 | | |
|----|----------|---|--------|---|---|
| JP | 06-93402 | | 4/1994 | | |
| JP | 06093402 | A * | 4/1994 | | |
| JP | 08333669 | A * | 12/1996 | | |
| JP | 10-306360 | | 11/1998 | | |
| JP | 11-158597 | | 6/1999 | | |
| JP | 2000-144362 | | 5/2000 | | |
| JP | 2003003300 | A * | 1/2003 | ............... | C25F 3/06 |
| JP | 2004-027263 | | 1/2004 | | |
| JP | 2006-061953 | | 3/2006 | | |
| JP | 2006061953 | A * | 3/2006 | | |
| JP | 2006-097102 | | 4/2006 | | |
| JP | 2006-307302 | | 11/2006 | | |
| JP | 2007-211279 | | 8/2007 | | |
| JP | 2007-231373 | | 9/2007 | | |
| JP | 2008-127637 | | 6/2008 | | |
| JP | 2010018856 | A * | 1/2010 | ............. | C22C 38/00 |
| JP | WO 2010030021 | A1 * | 3/2010 | ............. | C21D 1/20 |
| JP | 2011-017046 | | 1/2011 | | |
| JP | 2011094215 | A1 | 5/2011 | | |
| JP | 2011-111672 | | 6/2011 | | |

OTHER PUBLICATIONS

WO 2010/030021 machine translation.*
S. Dionne. "The characterization of continuous hot-dip galvanized and galvannalead steels." JOM. Mar. 2006. pp. 32-40.*
JP 06-093402 machine translation.*
JP 2006-061953 machine translation.*
JP 2003-003300 machine translation.*
JP 08-333669 machine translation (Year: 1996).*
Liu et al. "Characterization of hot-dip galvanized coating on dual phase steels." Surface & Coatings Technology 205 (2011) 3535-3539. (Year: 2011).*
Extended European Search Report dated Aug. 6, 2015 in corresponding European patent application No. 12837324.8.
International Search Report dated Dec. 25, 2012 issued in corresponding PCT Application No. PCT/JP2012/075203.

* cited by examiner

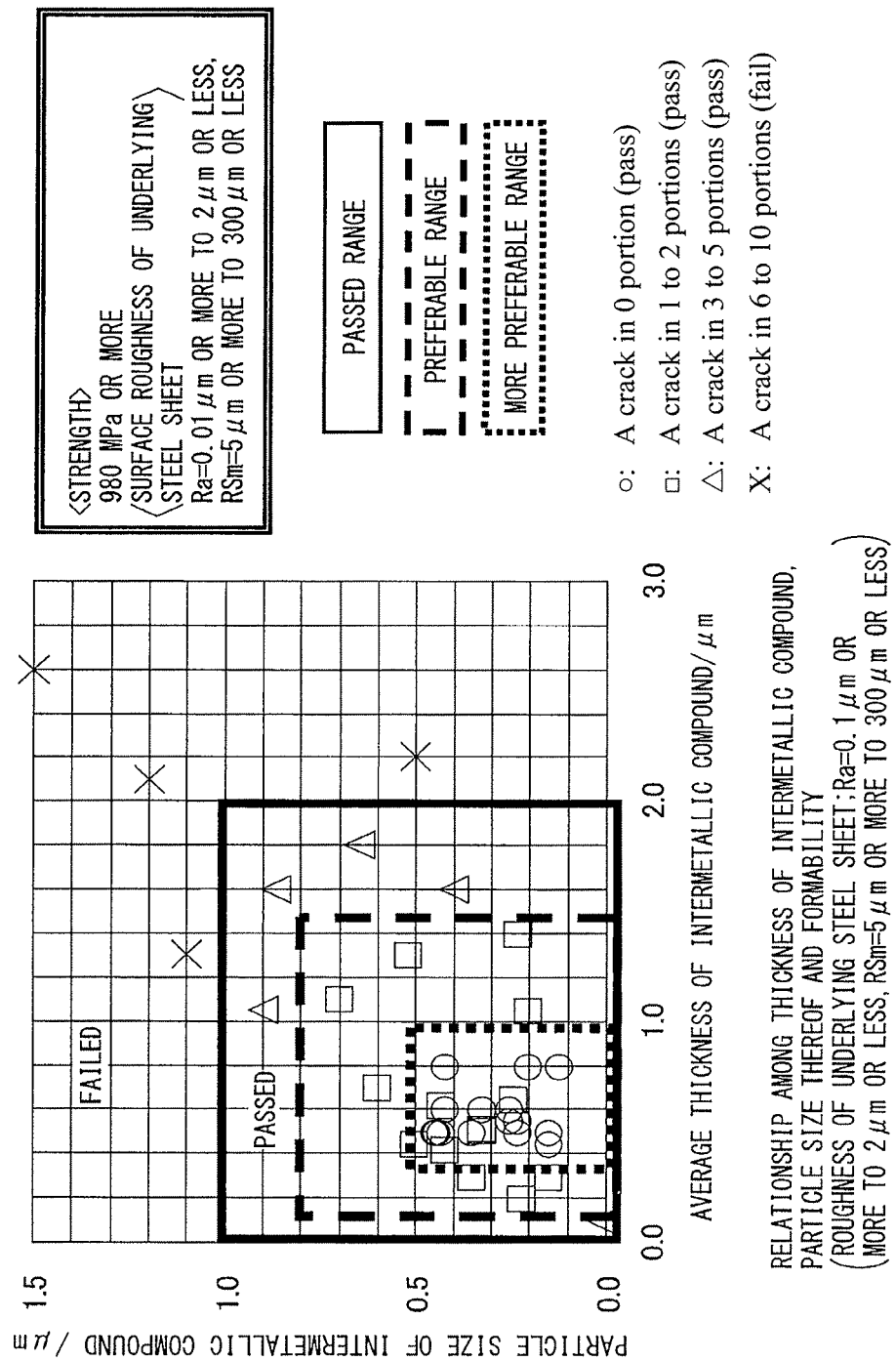

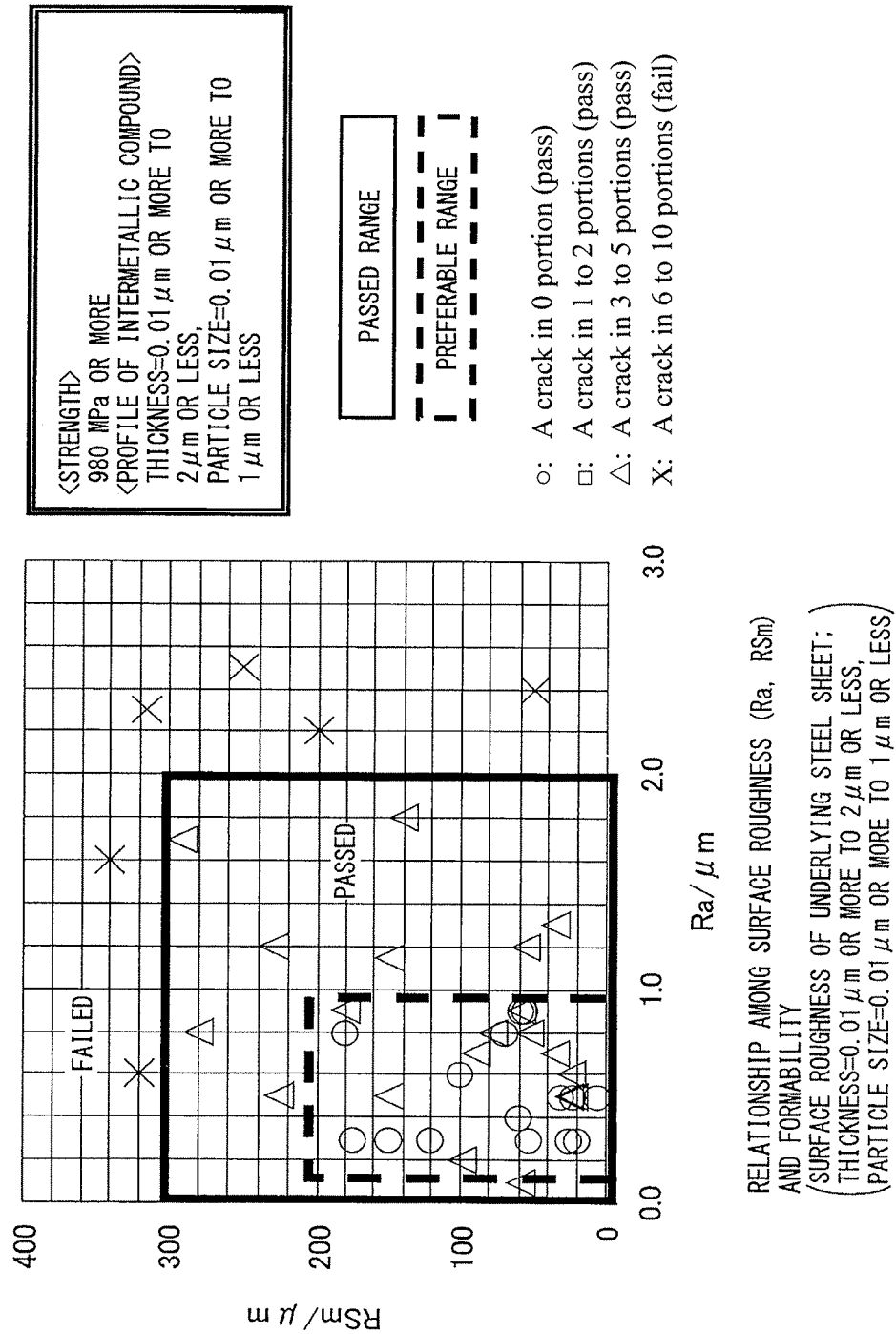

HIGH-STRENGTH HOT-DIP GALVANIZED STEEL SHEET

This application is a national stage application of International Application No. PCT/JP2012/075203, filed Sep 28, 2012, which claims priority to Japanese Application No. 2011-217146, filed Sep. 30, 2011, each of which is incorporated by reference in its entirety.

TECHNICAL FIELD

The present invention relates to a hot-dip galvanized steel sheet. More specifically, the present invention relates to a high-strength hot-dip galvanized steel sheet, which can easily realize a high strength (for example, a tensile strength of 980 MPa or more), is excellent in the formability thereof, and is suitably usable as a member in the automotive field, home appliance field, building material field and the like.

BACKGROUND ART

Heretofore, a hot-dip galvanized steel sheet has been used mainly in the automotive field. However, in the case of a hot-dip galvanized steel sheet using, as the substrate, a high-strength (for example, a tensile strength of 980 MPa or more) steel sheet, a crack may readily occur particularly in the underlying steel sheet during severe working thereof such as bending, and a stress concentration on that portion may cause a fracture in many cases.

From this standpoint, for example, Patent Document 1 has proposed to reduce the amount of Si enrichment in the surface of a steel sheet before the immersion thereof in a plating bath, to a certain value or less, by controlling an annealing atmosphere. However, the control itself to such an annealing atmosphere has been difficult.

Also, Patent Document 2 describes a high-strength steel sheet where Si+Al satisfies 0.7% or more and where as the steel sheet structure, the area ratio of the total amount of lower bainite and total martensite to the whole steel sheet structure is from 10 to 90%, the amount of retained (or residual) austenite is from 5 to 50%, and the area ratio of bainitic ferrite in upper bainite to the whole steel sheet structure is 5% or more. Patent Document 3 describes an alloyed hot-dip galvanized steel sheet having a microstructure containing, in terms of area ratio, from 20 to 75% of ferrite and from 5 to 25% of retained austenite, where the average crystal grain size of the ferrite is 10 μm or less. Patent Document 4 describes an alloyed hot-dip galvanized steel sheet having formed in the surface thereof, starting from the steel sheet side, a Γ phase, a mixed layer of Γ1 phase and δ1 phase, and a δ1 phase, or a δ1 phase and a ζ phase, wherein the average thickness of Γ phase is 1.5 μm or less, the average thickness of the mixed layer of Γ1 phase and δ1 phase is less than two times the average thickness of Γ phase, and the average aspect ratio (ratio of long side to short side in cross-sectional observation) of Γ1 crystal is 2 or more.

Further, Patent Document 5 describes an alloyed hot-dip galvanized steel sheet where the alloyed hot-dip galvanized layer has a chemical composition containing, in mass %, Fe: from 10 to 15% and Al: from 0.20 to 0.45, with the balance being Zn and impurities, and the interface adhesion strength between the steel sheet and the alloyed hot-dip galvanized layer is 20 MPa or more. Patent Document 6 describes an alloyed hot-dip galvanized steel sheet excellent in impact resistance and adhesion, having a coating weight of 20 to 100 g/m$^2$ on one surface or both surfaces, wherein the average Fe content of the plating layer is from 8 to 16% and the thickness of Γ phase in the plating layer is from 0.2 to 1.5 μm. Patent Document 7 describes a hot-dip galvanized steel sheet having a galvanized film in which an Fe—Al-based alloy layer, an Fe—Zn-based alloy layer and a zinc plating layer are present in this order starting from the base steel sheet side, wherein the Al content in the Fe—Al-based alloy layer is from 10 to 300 mg/m$^2$ and the thickness of the Fe—Zn-based alloy layer is ½ or less of the thickness of the galvanized film. Patent Document 8 describes an alloyed hot-dip galvanized steel sheet, wherein the number of iron-zinc alloy crystals in contact with the plating film/base iron interface is 5.5 or more per 1 μm of the interface.

However, with respect to a high-strength steel sheet having a high strength (for example, a tensile strength of 980 MPa or more), a hot-dip galvanized steel sheet exhibiting a sufficient effect may not be known.

RELATED ART

Patent Documents

[Patent Document 1] JP-A (Japanese Unexamined Patent Publication; KOKAI) No. 4-211887
[Patent Document 2] JP-A No. 2010-65273
[Patent Document 3] JP-A No. 2011-17046
[Patent Document 4] JP-A No. 10-306360
[Patent Document 5] JP-A No. 2006-97102
[Patent Document 6] JP-A No. 6-93402
[Patent Document 7] JP-A No. 2006-307302
[Patent Document 8] JP-A No. 2000-144362

SUMMARY OF THE INVENTION

Problem to be Solved by the Invention

An object of the present invention is to provide a hot-dip galvanized steel sheet comprising, as the substrate, a high-strength steel sheet having a high strength (for example, a tensile strength of 980 MPa or more), which is a high-strength hot-dip galvanized steel sheet which is capable of effectively suppressing a crack or a fracture and is excellent in formability.

Means for Solving the Problem

As a result of earnest study, the present inventors have found that an intermetallic compound composed of mainly Fe, Al and Zn is deposited to a thickness in a predetermined range on an interface between the hot-dip galvanized layer and an underlying steel sheet, and further, the contents of Ra and RSm in the steel sheet surface after the removal of the hot-dip galvanized layer are controlled to fall in a predetermined range, whereby the formability can be enhanced, while suppressing a crack or a fracture of the steel sheet during severe working.

Thus, the present invention relates to a high-strength alloyed hot-dip galvanized steel sheet, which is excellent in formability. The present invention may include, for example, the following embodiments.

[1] A hot-dip galvanized steel sheet, which is a steel sheet comprising, in mass %,
C: from 0.10 to 0.4%,
Si: from 0.01 to 0.5%,
Mn: from 1.0 to 3.0%,
O: 0.006% or less,
P: 0.04% or less, S: 0.01% or less,
Al: from 0.1 to 3.0%, and
N: 0.01% or less, with the balance being Fe and unavoidable impurities,
wherein the structure of the steel sheet further comprises, in terms of volume fraction, 40% or more of the total content of bainite and martensite, from 8 to 60% of retained austenite, and less than 40% of ferrite, with the balance being an unavoidable structure, and alloying hot-dip galvanization is applied to the steel sheet surface, and
the hot-dip galvanized steel sheet has a layer of an intermetallic compound composed of Fe, Al, Zn and unavoidable impurities at the interface between the hot-dip galvanized layer and the underling steel sheet, the average thickness of the intermetallic compound is 0.1 to 2 μm or less, and the crystal grain size of the intermetallic compound is 0.01 or more to 1 μm or less, and
the arithmetic mean roughness Ra of the underlying steel sheet surface after removing the hot-dip galvanized layer is 0.1 or more to 2.0 μm or less, and the average length RSm of the contour curve element in the roughness curve is 5 or more to 300 μm or less.

[2] The hot-dip galvanized steel sheet according to [1], wherein the steel sheet further comprises one member or two or more members of, in mass %,
Cr: from 0.05 to 1.0%,
Ni: from 0.05 to 1.0%,
Cu: from 0.05 to 1.0%,
Nb: from 0.005 to 0.3%,
Ti: from 0.005 to 0.3%,
V: from 0.005 to 0.5%,
B: from 0.0001 to 0.01%,
Ca: from 0.0005 to 0.04%,
Mg: from 0.0005 to 0.04%,
La: from 0.0005 to 0.04%,
Ce: from 0.0005 to 0.04%, and
Y: from 0.0005 to 0.04%.

[3] A process for producing a hot-dip galvanized steel sheet, comprising:
heating a steel material comprising, in mass %,
C: from 0.10 to 0.4%,
Si: from 0.01 to 0.5%,
Mn: from 1.0 to 3.0%,
O: 0.006% or less,
P: 0.04% or less,
S: 0.01% or less,
Al: from 0.1 to 3.0%, and
N: 0.01% or less, with the balance being Fe and unavoidable impurities, at 1,100 to 1,300° C. and then subjecting the steel sheet to a hot rolling treatment at a finish rolling temperature of Ar3 temperature or more;
taking up the hot-rolled steel sheet at a take-up temperature of 700° C. or less and then cold-rolling the steel sheet;
annealing the cold-rolled steel sheet at a maximum heating temperature of 750 to 900° C.;
cooling the annealed steel sheet to a plating bath immersion temperature at a cooling rate of 3 to 200° C./sec in the range of 500 to 750° C. and then holding the steel sheet at 350 to 500° C. for 10 to 1,000 seconds;
performing a plating treatment by immersing the steel sheet in a hot-dip galvanizing bath having an Al concentration $W_{Al}$ and an Fe concentration $W_{Fe}$ satisfying, in mass %, the following relational expressions (1) and (2), at a steel sheet temperature ranging, on immersion in a plating bath, from a temperature 40° C. lower than the hot-dip galvanizing bath temperature to a temperature 50° C. higher than the hot-dip galvanizing bath temperature, in a nitrogen atmosphere having a nitrogen content of 95 mass % or more, in which the logarithm $\log(P_{H2O}/P_{H2})$ value of the ratio between hydrogen partial pressure $P_{H2}$ and water vapor partial pressure $P_{H2O}$ is from −5 to −2:

$$0.01 \leq W_{Fe} \leq 0.05 \tag{1}$$

$$0.07 \leq (W_{Al} - W_{Fe}) \leq 0.30 \tag{2}$$

on the roll surface of the final stand at the cold rolling, the arithmetic mean roughness Ra is 0.1 or more to 8.0 μm or less, and the average length RSm of the contour curve element in the roughness curve is 5 or more to 1,200 μm or less,
wherein Ar3=901−325×C+33×Si−92×(Mn+Ni/2+Cr/2+Cu/2+Mo/2), wherein C, Si, Mn, Ni, Cr, Cu and Mo indicate the contents (mass %) of respective components and take 0 when the component is not contained.

[4] The process for producing a high-strength hot-dip galvanized steel sheet according to [3], wherein on the surface of a roll in one stage before final stand at the cold rolling, the arithmetic mean roughness Ra is 0.1 or more to 8.0 μm or less, and the average length RSm of the contour curve element in the roughness curve is 5 or more to 1,200 μm or less.

EFFECT OF THE INVENTION

The present invention can provide a hot-dip galvanized steel sheet which is excellent in formability. The production of the high-strength hot-dip galvanized steel sheet according to the present invention may be relatively easy and can be performed stably. Therefore, the high-strength hot-dip galvanized steel sheet may be optimally usable particularly as a steel sheet for automobiles in recent years, which is intended for attaining weight reduction. As a result, the industrial value thereof may be remarkably high.

BRIEF DESCRIPTION OF THE DRAWINGS

FIG. 1 is a graph showing a relationship among the thickness and particle size of an intermetallic compound, and the formability. In the figure, plots of ○, □, Δ, and ×represent the evaluation results relating to the later-described formability; all of ○, □, Δ show Examples where the formability pass, and ×shows Comparative Examples where the formability fail.

FIG. 1 is a graph showing a relationship between the roughness of an underlying steel sheet, and the formability. In the figure, plots of ○, □, Δ, and ×representevaluation results relating to the later-described formability; all of ○, □, and Δ show Examples where the formability pass, and ×shows Comparative Examples where the formability fail.

MODES FOR CARRYING OUT THE INVENTION

Hereinbelow, the present invention is described in sequence.
First, the reasons for the limitation on the components are described. In this connection, "%" means mass %.
C:
C may be an element capable of increasing the strength of the steel sheet. However, if its content is less than 0.1%, it may be difficult to satisfy both of the tensile strength of 980 MPa or more, and the workability. On the other hand, if the content exceeds 0.40%, spot weldability can be hardly ensured. For this reason, the content is set to be from 0.1 to 0.40% or less. The C content may preferably be from 0.12 to 0.3, more preferably from 0.13 to 0.28%

Si:

Si may be an alloying (or strengthening) element and may be effective in increasing the strength of the steel sheet. Also, this element may suppress the precipitation of cementite and in turn, contribute to stabilization of retained austenite, and therefore, its addition may be indispensable. If its content is less than 0.01%, the effect of increasing the strength may be small. On the other hand, if the content exceeds 0.5%, the workability may be reduced. For this reason, the Si content is set to be from 0.01 to 0.5%. The Si content may preferably be from 0.05 to 0.45%, more preferably from 0.15 to 0.42%.

Mn:

Mn may be an alloying element and may be effective in increasing the strength of the steel sheet. However, if its content is less than 1.0%, the tensile strength of 980 MPa or more may be difficult to obtain. On the other hand, if the content is large, co-segregation with P or S may be promoted to involve significant deterioration of the workability and therefore, an upper limit of 3.0% is specified. For this reason, the Mn content is set to be from 1.0 to 3.0%. The Mn content may preferably be from 2.0 to 2.7%, more preferably from 2.03 to 2.6%.

O:

O may form an oxide and deteriorate the elongation, bendability or hole expandability and therefore, the amount added of this element must be kept low. Among others, an oxide may often exist as an inclusion and when the oxide is present in the punched edge face or cut surface, a notched flaw or a coarse dimple may be formed on the end face to invite stress concentration during hole expansion or severe working and serve as an origin of crack formation, giving rise to significant deterioration of the hole expandability or bendability. If the content of 0 exceeds 0.006%, the above-described tendency may be conspicuous, and therefore, the O content is specified to an upper limit of 0.006% or less. That is, O is limited as an impurity to 0.006% or less. The O content may preferably be 0.004% or less, more preferably 0.003% or less. On the other hand, an O content of less than 0.0001% may be economically disadvantageous because of involving an excessive rise in the cost, and therefore, this value may be substantially the lower limit.

P:

P may tend to be segregated at the center in the sheet thickness of the steel sheet and bring about embrittlement of a welded part. If its content exceeds 0.04%, significant embrittlement of the welded part may occur, and formability is also reduced. Therefore, a proper content range of 0.04% or less is specified. That is, P is limited as an impurity to 0.04% or less. The P content may preferably be 0.03% or less, more preferably 0.025% or less. The lower limit of P content may not be particularly specified, but a content of less than 0.0001% may be economically disadvantageous, and therefore, this value may preferably be set as the lower limit.

S:

S may adversely affect the weldability and manufacturability during casting and hot rolling. For this reason, the upper limit of its content is set to 0.01% or less. That is, S is limited as an impurity to 0.01% or less. The S content may preferably be 0.006% or less, more preferably 0.005% or less. The lower limit of S content may not be particularly specified, but a content of less than 0.0001% may be economically disadvantageous, and therefore, this value may preferably be set as the lower limit. In addition, since S may be bound to Mn to form coarse MnS and deteriorate the formability such as bendability or hole expandability, the content of this element should be set as low as possible.

Al:

Al may promote ferrite formation to enhance the ductility and therefore, may be added. This element may also be utilized as a deoxidizing agent. If its content is less than 0.1%, the effect of the element may be insufficient. On the other hand, its excessive addition may lead to an increase in the number of Al-based coarse inclusions and give rise to deterioration of hole expandability or cause a surface flaw. For this reason, the upper limit of Al content is set to be 3.0%. The Al content may preferably be from 0.2 to 1.5%, more preferably from 0.3 to 1.0%.

N:

N may form a coarse nitride to deteriorate the bendability or hole expandability and therefore, the amount added thereof must be kept low. If the N content exceeds 0.01%, the tendency above may be conspicuous, and therefore, the range of the N content is set to 0.01% or less. The N content may preferably be 0.007% or less, more preferably 0.005% or less. From the standpoint of reducing the formation of a blow hole during welding, the N content may be smaller. Although the effects according to the present invention can be achieved without particularly specifying the lower limit, an N content of less than 0.0005% may involve a great increase in the production cost, and therefore, this value may be substantially the lower limit.

Cr:

Cr may be an alloying element and at the same time, may be important in enhancing the quenchability. However, if its content is less than 0.05%, these effects may not be obtained, and therefore, a lower limit of 0.05% is specified. On the contrary, containing this element in excess of 1.0% may adversely affect the manufacturability during production and hot rolling, and therefore, an upper limit of 1.0% is specified. The Cr content may preferably be 0.6% or less, more preferably 0.5% or less.

Ni:

Ni may be an alloying element and at the same time, may be important in enhancing the quenchability. In addition, this element may enhance the wettability of molten metal or promote a reaction and therefore, may be added. However, if its content is less than 0.05%, these effects may not be obtained, and therefore, a lower limit of 0.05% is specified. On the contrary, containing this element in excess of 1.0% may adversely affect the manufacturability during production and hot rolling, and therefore, an upper limit of 1.0% is specified. The Ni content may preferably be 0.7% or less, more preferably 0.6% or less.

Cu:

Cu may be an alloying element and at the same time, may be important in enhancing the quenchability. In addition, this element may enhance the wettability of molten metal or promote a reaction and therefore, may be added. However, if its content is less than 0.05%, these effects may not be obtained, and therefore, a lower limit of 0.05% is specified. On the contrary, containing this element in excess of 1.0% may adversely affect the manufacturability during production and hot rolling, and therefore, an upper limit of 1.0% is specified. The Cu content may preferably be 0.6% or less, more preferably 0.5% or less.

Nb:

Nb may be an alloying element and may contribute to increase in the strength of the steel sheet by precipitation strengthening, fine grain strengthening through suppressing growth of a ferrite crystal grain, and dislocation strengthening through suppressing recrystallization. If the amount added thereof is less than 0.005%, these effects may not be obtained, and therefore, a lower limit of 0.005% is specified. If this element is contained in excess of 0.3%, the amount of carbonitride precipitated may be increased to deteriorate the formability, and therefore, an upper limit of 0.3% is specified. The Nb content may preferably be 0.25% or less, more preferably 0.20% or less.

Ti:

Ti may be an alloying element and may contribute to increase in the strength of the steel sheet by precipitation strengthening, fine grain strengthening through suppressing growth of a ferrite crystal grain, and dislocation strengthening through suppressing recrystallization. If the amount added thereof is less than 0.005%, these effects may not be obtained, and therefore, a lower limit of 0.005% is specified. If this element is contained in excess of 0.3%, the amount of carbonitride precipitated may be increased to deteriorate the formability, and therefore, an upper limit of 0.3% is specified. The Ti content may preferably be 0.25% or less, more preferably 0.20% or less.

V:

V may be an alloying element and may contribute to increase in the strength of the steel sheet by precipitation strengthening, fine grain strengthening through suppressing growth of a ferrite crystal grain, and dislocation strengthening through suppressing recrystallization. If the amount added thereof is less than 0.005%, these effects may not be obtained, and therefore, a lower limit of 0.005% is specified. If this element is contained in excess of 0.5%, the amount of carbonitride precipitated may be increased to deteriorate the formability, and therefore, an upper limit of 0.5% is specified. The V content may preferably be 0.45% or less, more preferably 0.3% or less.

Addition of B in an amount of 0.0001% or more may be effective in strengthening a grain boundary or increasing the strength of the steel material, but if the amount added exceeds 0.01%, not only the effect may be saturated but also the manufacturability during hot rolling may be reduced, and therefore, an upper limit of 0.01% is specified.

One member or two or more members selected from Ca, Mg and REM may be added in a total amount of 0.0005 to 0.04%. Ca, Mg and REM may be an element used for deoxidization, and it may be preferred to contain one member or two or more members thereof in a total amount of 0.0005% or more. Here, REM is Rare Earth Metal. However, if the total content of Ca, Mg and REM exceeds 0.04%, degradation of forming workability may be caused. For this reason, the total content thereof is set to be from 0.0005 to 0.04%.

Incidentally, in the present invention, REM may be added in the form of misch metal in many cases, and there may be a case in which a combination of elements in the lanthanoid series is contained in addition to La and Ce. Even when such elements in the lanthanoid series other than La and Ce are contained as unavoidable impurities, the effects according to the present invention may be brought out. In this connection, the effects according to the present invention may also be brought out even when metallic La and Ce are added.

The structure of the steel material may be described below.

In the steel sheet according to the present invention, the total content of bainite and martensite should be 40% or more. The bainite and martensite may be necessary to ensure elongation and strength. The lower limit of their total content percentage is set to 40%, because if the volume fraction of total content is less than 40%, the effect thereof is poor.

The steel sheet according to the present invention needs to contain, in terms of volume fraction, from 8 to 60% of retained austenite. By containing retained austenite, increase in the strength and further improvement of ductility may be achieved at the same time. If the volume fraction is less than 8%, the effect above can be hardly obtained, and therefore, a lower limit of 8% or more is specified. An upper limit of 60% or less is specified, because if its volume fraction exceeds 60%, the volume fraction of bainite or martensite may be less than 40%, and sufficient elongation and strength may not be secured. The volume fraction of retained austenite (γ) may preferably be from 9 to 40%, more preferably from 10 to 30%.

The ferrite content must be less than 40%. Ferrite may enhance the ductility, but if the content is 40% or more, the strength cannot be secured. As the form of ferrite, acicular ferrite may be incorporated other than polygonal ferrite.

Also, the unavoidable structure of the balance as used in the present invention indicates a pearlite structure.

With respect to the above-described microstructure phases, ferrite, martensite, bainite, austenite, pearlite and the balance structure, the identification, observation of existing position, and measurement of area ratio can be performed by using a nital reagent and a reagent disclosed in JP-A No. 59-219473 to etch the steel sheet in the rolling direction cross-section or the cross-section in the direction perpendicular to the rolling direction and effecting a quantitative determination by observation through an optical microscope at 1,000 times and scanning and transmission electron microscopes at 1,000 to 100,000 times. After observation of 20 or more visual fields for each, the area ratio of each structure can be determined by a point counting method or image analysis.

The constitution of the hot-dip galvanized layer may be described below.

In the hot-dip galvanized steel sheet of the present invention, an intermetallic compound composed of Fe, Al, Zn and unavoidable impurities is present in an average thickness of 0.1 to 2 μm at the interface between the hot-dip galvanized layer and the underlying steel sheet. Further, the crystal grain size of the intermetallic compound is from 0.01 to 1 μm, the arithmetic mean roughness Ra of the underlying steel sheet surface after removing the hot-dip galvanized layer is from 0.1 to 2.0 μm, and the average length RSm of the contour curve element in the roughness curve is from 5 to 300 μm.

The intermetallic compound composed of Fe, Al, Zn and unavoidable impurities may be necessary for suppressing a fracture of the underlying steel sheet. The reason therefor may not be necessarily clear, but according to the knowledge of the present inventors, it may be presumed that the intermetallic compound cracks in a finely dispersed manner during bending work and thereby produces an effect of preventing stress concentration on the cracked part of the underlying steel sheet.

As shown in FIG. 1, if the thickness of the intermetallic compound is less than 0.1 μm, the effect of the compound may be poor, whereas if the thickness exceeds 2 μm, the intermetallic compound itself may not be finely cracked and a local crack may be generated, making it impossible to relieve the stress concentration. For this reason, the thickness of the intermetallic compound is from 0.1 to 2 μm. The thickness may be preferably from 0.2 to 1.5 μm, more preferably from 0.4 to 1 μm.

Also, as seen similarly from FIG. 1, the average crystal grain size of the intermetallic compound must be from 0.01 to 1 μm. If the average crystal grain size exceeds 1 μm, the intermetallic compound may not form a fine crack but may form a local cleavage, and stress concentration on that portion may readily occur. The grain size may be preferably smaller, but if the grain size is less than 0.01 µm, not only the effect of the compound may be saturated but also the production load for ensuring a thickness of 0.1 µm or more may be increased. For this reason, the average crystal grain size of the intermetallic compound is from 0.01 to 1 µm. The average crystal grain size may be preferably from 0.01 to 0.8 µm, more preferably from 0.01 to 0.5 µm.

The process for measuring the thickness of the intermetallic compound may include various methods and include, for example, "Microscopic Cross-Sectional Test Method" (JIS H 8501). This may be a method where the cross-section of the sample is embedded, polished and then, if desired, etched with an etchant and the polished surface is analyzed by an optical microscope, a scanning electron microscope (SEM), an electron beam microanalyzer (EPMA) or the like to determine the thickness.

In the present invention, the sample was embedded in Technovit 4002 (produced by Maruto Instrument Co., Ltd.), polished with polishing papers (JIS R 6001) #240, #320, #400, #600, #800 and #1000 in this order, and a portion of the polished face corresponding to the plating layer to the depth of 5 µm of the underlying steel sheet is observed with EPMA by using a line analysis along a perpendicular direction to the interface between the plating layer and the underlying steel sheet, to thereby determine the thickness.

In this connection, the thickness of the intermetallic compound as used herein may mean a value obtained by determining the thickness of the intermetallic compound in the plating layer at arbitrary 10 portions spaced apart from one another by 1 mm or more and averaging the determined thicknesses of the intermetallic compound. The composition and structure of the intermetallic compound may be different from those of ζ phase ($Fe_3Zn_{13}$), $δ_1$ phase ($FeZn_7$), $Γ_1$ phase ($Fe_5Zn_{21}$) and Γ phase ($Fe_3Zn_{10}$) which are Fe, Zn and Fe—Zn alloy phase. Therefore, the intermetallic compound can be identified by the analysis using EPMA, an X-ray diffraction method (XRD), a transmission electron microscope (TEM) or the like.

In the present invention, the kind of each alloy phase was identified by TEM analysis (the same analysis as those described, for example, in Hong, M. N., and Saka, H., *Proc. 4th Intern. Conf. On Zn and Zn Alloy Coated Steel Sheet, Galvatech '98*, p. 248, 1998; and Kato, T., Hong, M. H., Nunome, K., Sasaki, K., Kuroda, K., and Saka, H., *Thin Solid Films*, 319, 132, 1998). For details of the analysis method by TEM, these publications can be referred to, if desired.

The crystal grain size of the intermetallic compound may be measured by various methods, but in the present invention, the crystal grain size may be measured by the following method. First, a sample may be produced by immersing the steel sheet of the present invention in fuming nitric acid to dissolve and remove the hot-dip galvanized layer. The time for which the steel sheet is immersed may vary depending on the thickness of the plating layer, but a bubble may be generated by a corrosion reaction of the plating layer during dissolving, and the bubble may stop occurring when the dissolving is terminated. Therefore, the immersion may be stopped upon disappearance of the bubble. Since the intermetallic compound may be difficult to dissolve in fuming nitric acid, the crystal grain size of the remaining intermetallic compound may be measured by observing the surface of the sample after dissolving and removal of the plating layer by SEM at 50,000 times. However, the crystal grain size of the intermetallic compound as used herein may mean an average value of diameters obtained by determining the diameter of a crystal grain (when the crystal grain is a polygonal grain, the diameter of a circle assuming a minimum circle including the crystal grain) on arbitrary 10 crystal grains of intermetallic compound in the visual field of SEM observation).

Also, the underlying steel sheet surface after removing the hot-dip galvanized layer must have a certain degree of roughness. The reason therefor may be because when the underlying steel sheet surface is nearly smooth, the anchor effect of anchoring the intermetallic compound to the underlying steel sheet surface may be insufficient, and the intermetallic compound may be readily separated during work, failing in offering any effect on fracture prevention of the underlying steel sheet. This effect may be exerted when, as shown in FIG. 2, the arithmetic mean roughness Ra of the underlying steel sheet surface is 0.1 µm or more. On the other hand, if Ra exceeds 2 µm, the unevenness may conversely produce a portion on which the stress is concentrated, as a result, a fracture may readily occur. For this reason, Ra is from 0.1 to 2.0 µm. Ra may be preferably from 0.2 to 1.0 µm.

In the present invention, the average length RSm of the contour curve element in the roughness curve must fall in a certain range. As shown in FIG. 2, if RSm exceeds 300 µm, the surface may become nearly smooth, and the anchor effect may be insufficient. RSm may be preferably smaller, but if it is less than 5 µm, the effect thereof may be saturated, and only a needless increase in the production cost may be involved. For this reason, RSm is from 5 to 300 µm. RSm may be preferably from 10 to 200 µm.

Incidentally, Ra and RSm as used herein may mean the arithmetic mean roughness and the average length of roughness curve element, respectively, which are defined in JIS B 0601.

In the measurements of these, the plating layer may be removed by treating the hot-dip galvanized steel sheet with an inhibitor-containing hydrochloric acid to expose the underlying steel sheet surface, and the roughness of the steel sheet surface may be then measured. For example, in the present invention, the hot-dip galvanized steel sheet was immersed in a solution prepared by adding 0.02% of IBIT 700A (produced by Asahi Chemical Co., Ltd.) as an inhibitor to an aqueous 5% hydrochloric acid solution, whereby the underlying steel sheet surface was exposed.

The time for which the steel sheet is immersed may vary depending on the thickness of the plating layer, but a bubble may be generated by a corrosion reaction of the plating layer during dissolving, and the bubble may stop occurring when the dissolving is terminated. Therefore, the immersion may be stopped upon disappearance of the bubble. Since the underlying steel sheet surface may be difficult to be dissolved due to the action of inhibitor, a sample with the underlying steel sheet surface being exposed can be obtained by the method above. Subsequently, the surface was measured to determine Ra and RSm by Handy Surf E-40A (manufactured by Tokyo Seimitsu Co., Ltd.) under the conditions of an evaluation length of 4 mm and a cutoff value of 0.8 mm.

The production process of the high-strength hot-dip galvanized steel sheet with excellent formability according to the present invention may be described below. In the present invention the production process preceding hot rolling may not be particularly limited. Namely, various kinds of secondary refining may be performed subsequently to smelting in a blast furnace, an electric furnace or the like, and thereafter, casting may be performed by normal continuous casting, casting by an ingot method, thin slab casting or other methods. In the case of continuous casting, the steel may be once cooled to a low temperature, again heated and then hot-rolled, or the cast slab may be continuously hot-rolled. Scrap may be used for the raw material.

The effects according to the present invention can be brought out without particularly specifying the hot-rolled slab heating temperature. However, an excessively high heating temperature may not be preferred from an economical point of view, and therefore, the upper limit of the heating temperature may preferably be less than 1,300° C. Also, if the heating temperature is excessively low, the finish rolling temperature can be hardly controlled to Ar3 temperature or more, and therefore, the lower-limit temperature may preferably be 1,100° C.

If the finish rolling temperature enters the two-phase region of austenite+ferrite, the structural non-uniformity in the steel sheet may be increased to deteriorate the formability after annealing. For this reason, the finish rolling temperature may preferably be Ar3 temperature or more. Incidentally, the Ar3 temperature may be calculated according to the following formula:

$$Ar3=901-325 \times C+33 \times Si-92 \times (Mn+Ni/2+Cr/2+Cu/2+Mo/2)$$

Cooling after rolling may not be particularly specified, and the effects according to the present invention can be obtained even when a cooling pattern for performing structure control matching respective purposes is employed.

The take-up temperature must be 700° C. or less. If the take-up temperature exceeds 700° C., not only a coarse ferrite or pearlite structure may be allowed to exist in the hot-rolled structure, giving rise to a failure in keeping retained austenite to fall in the range according to the present invention and in turn, obtaining an underlying steel sheet in the scope according to the present invention, but also the structure non-uniformity after annealing may tend to become large, leading to an increase in material anisotropy of the final product. In the present invention, it may be preferred to enhance the strength-ductility balance by making the structure after annealing fine. Also, a take-up temperature exceeding 700° C. may not be preferred, because the thickness of an oxide formed on the steel sheet surface may be excessively increased and in turn, the pickling effect may be poor. Although the effects according to the present invention can be brought out without particularly specifying the lower limit, taking up at a temperature not more than room temperature may be technically difficult and therefore, this temperature may be substantially the lower limit. Incidentally, at the hot rolling, finish rolling may be continuously performed by splicing crude rolled sheets together. Also, the crude rolled sheet may be once taken up.

The steel sheet after hot rolling may be usually subjected to removal of scale on the surface by a pickling treatment. Pickling may be performed once, or pickling may be performed in a plurality of parts.

The hot-rolled steel sheet after pickling may be usually cold-rolled. The rolling reduction ratio may preferably be from 40 to 80%. If the rolling reduction ratio is less than 40%, the shape can be hardly kept flat or the ductility of the final product may become bad. On the other hand, in the case of cold rolling at a reduction ratio in excess of 80%, the cold-rolling load may be excessively large, and the cold rolling may become difficult. The effects according to the present invention can be brought out without particularly specifying the number of rolling passes and the rolling reduction ratio of each pass. However, the steel sheet surface after cold rolling must be in a state where the arithmetic mean roughness Ra is from 0.1 to 2.0 μm and the average length RSm of the contour curve element in the roughness curve is from 5 to 300 μm. To create this state, the roll surface of the final stand of cold rolling may be preferably worked such that the arithmetic mean roughness Ra becomes from 0.1 to 8.0 μm and the average length RSm of the contour curve element in the roughness curve becomes from 5 to 1,200 μm. It may be more preferred that a roll in one stage before final stand is also worked to have Ra and RSm in the same ranges.

In the present invention, the cold-rolled steel sheet may be usually subjected to annealing and plating in a continuous annealing and plating line. Although the effects according to the present invention can be brought out without particularly specifying the heating rate during passing through the line, a heating rate of less than 0.5° C./sec may not be preferred, because the productivity may be greatly impaired. On the other hand, a heating rate exceeding 100° C./sec may involve excessive capital investment and may not be economically preferred.

In the present invention, the maximum heating temperature (annealing temperature) must be from 750 to 900° C. If the maximum heating temperature is less than 750° C., it may take too much time for the carbide formed during hot rolling to again enter a solid solution state, and a carbide or a part thereof may remain, as a result, a strength of 980 MPa or more can be hardly secured, failing in obtaining an underlying steel sheet within the scope according to the present invention. For this reason, the lower limit of the maximum heating temperature may be 750° C. On the other hand, excessively high-temperature heating may not only involve a rise in the cost and be disadvantageous from an economical point of view but also may induce a trouble such as deterioration of a sheet shape during passing of the sheet through the line at a high temperature or decrease in life of the roll. For this reason, the upper limit of the maximum heating temperature may be 900° C.

The heat treatment time in this temperature region may not be particularly limited, but for achieving dissolution of carbide, a heat treatment for 10 seconds or more may be preferred. On the other hand, if the heat treatment time exceeds 600 seconds, a rise in the cost may be involved, and therefore, such a heat treatment time may be not preferred from an economical point of view. Also in the heat treatment, isothermal holding may be performed at the maximum heating temperature, and even when gradient heating is performed and after reaching the maximum heating temperature, cooling is immediately started, the effects according to the present invention may be brought out.

After the completion of annealing, the steel sheet may be usually cooled to the plating bath immersion temperature. The average cooling rate from the maximum heating temperature to 750° C. may preferably be from 0.1 to 200° C./sec. A cooling rate of less than 0.1° C./sec may be not preferred, because the productivity may be greatly impaired. An excessive increase in the cooling rate may involve a rise in the production cost, and therefore, the upper limit may preferably be 200° C./sec.

In the present invention, the cooling rate in the range of 500 to 750° C. must be from 3 to 200° C./sec. If the cooling rate is too low, austenite may transform to a pearlite structure in the cooling process, and the austenite volume fraction of 8% or more can be hardly secured. For this reason, the lower limit may be 3° C./sec or more. Even if the cooling rate is increased, there may be no problem in terms of steel quality, but an excessive increase in the cooling rate may involve a rise in the production cost, and therefore, the upper limit may preferably be 200° C./sec. The cooling method may be any process for roll cooling, air cooling, water cooling, and a combination thereof.

Thereafter, in the present invention, the steel sheet may be held at a temperature of 350 to 500° C. for 10 to 1,000 seconds to cause bainite transformation and stabilize the retained austenite. The upper limit of the holding temperature may be set to 500° C., because bainite transformation may occur at not more than that temperature. Incidentally, if the steel sheet is held at a temperature of less than 350° C., the bainite transformation may spend a long time and in turn, excessively large equipment may be required, giving rise to poor productivity. For this reason, the holding temperature must be from 350 to 500° C. The lower limit may be set to 10 seconds, because holding for less than 10 seconds may not allow bainite transformation to proceed sufficiently, making it impossible to stabilize the retained austenite and obtain excellent formability. On the other hand, holding for more than 1,000 seconds may cause reduction in the productivity and may be not preferred. Incidentally, holding may not indicate only isothermal holding but may encompass gradual cooling or heating in this temperature region.

The sheet temperature on immersion in the plating bath may preferably be from a temperature 40° C. lower than the hot-dip galvanizing bath temperature to a temperature 50° C. higher than the hot-dip galvanizing bath temperature. If the bath-immersion sheet temperature is less than (hot-dip galvanizing bath temperature–40)° C., not only the heat extraction at immersion and entry in the plating bath may be large, causing partial solidification of the molten zinc to deteriorate the plating appearance, but also the intermetallic compound is less liable to be produced, which is an essential feature of the present invention. For this reason, the lower limit is set to (hot-dip galvanizing bath temperature–40)° C. However, even when the sheet temperature before immersion is below (hot-dip galvanizing bath temperature–40)° C., the steel sheet may be reheated before immersion in the plating bath to a sheet temperature of (hot-dip galvanizing bath temperature–40)° C. or more and then be immersed in the galvanizing bath. On the other hand, if the plating bath immersion temperature exceeds (hot-dip galvanizing bath temperature+50)° C., a problem in the operation may be caused, along with the increase in the plating bath temperature. A preferred range may have a lower limit of (hot-dip galvanizing bath temperature–20)° C. and an upper limit of (hot-dip galvanizing bath temperature+30)° C., and a more preferred range may have a lower limit of (hot-dip galvanizing bath temperature–10)° C. and an upper limit of (hot-dip galvanizing bath temperature+20)° C.

In addition to pure zinc, Al must be added to the plating bath. By virtue of adding Al, an intermetallic compound composed of Fe, Al and Zn, which is an essential requirement of the present invention, can be produced. Incidentally, the plating bath may contain Fe, Al, Mg, Mn, Si, Cr and the like, in addition to pure zinc.

The atmosphere at the time of immersing the steel sheet in the plating bath is a nitrogen atmosphere having a nitrogen content of 95 vol. % or more, in which the logarithm $\log(P_{H2O}/P_{H2})$ value of hydrogen partial pressure $P_{H2}$ to water vapor partial pressure $P_{H2O}$ is from –5 to –2. If the $\log(P_{H2O}/P_{H2})$ value is less than –5, this may not be preferred from an economical viewpoint. In addition, the reactivity on the steel sheet surface or plating bath surface may be increased to allow thick formation of brittle Fe—Zn alloy layer, and the plating adhesion during working may be poor. On the other hand, if the $\log(P_{H2O}/P_{H2})$ value exceeds –2, a Zn oxide may be formed on the plating bath surface and inhibit formation of the intermetallic compound composed of Fe, Al and Zn may be insufficient, and as a result, not only a plating within the scope according to the present invention may not be obtained but also the plating may not adhere to the steel sheet, giving rise to unplating. If the nitrogen content is less than 95 vol. %, the proportion of water vapor and hydrogen in the atmosphere may be increased, which may not be preferred in view of profitability and safety. An increase in the proportion of hydrogen in the atmosphere may cause embrittlement of the steel sheet and reduction in the ductility and not be preferred. The atmosphere at the time of immersing the steel sheet in the plating bath as used herein may mean an atmosphere in the furnace at least 10 seconds or more before immersion in the plating bath, based on the time at which the steel sheet is immersed in the plating bath, and may mean the whole atmosphere in the time period maximally from annealing to immersion in the plating bath in a continuous annealing and plating line.

In order to control the properties of the plating layer, the hot-dip galvanizing bath is a plating bath having an Al concentration $W_{Al}$ and a Fe concentration $W_{Fe}$ satisfying, in mass %, the following relational expressions (1) and (2):

$$0.01 \leq W_{Fe} \leq 0.05 \tag{1}$$

$$0.07 \leq (W_{Al} - W_{Fe}) \leq 0.30 \tag{2}$$

If $W_{Fe}$ is less than 0.01, a brittle Zn—Fe alloy layer, may be formed thick at the interface between the plating layer and the steel sheet, and the plating adhesion at during working may be poor. If $W_{Fe}$ exceeds 0.05, a thick layer of an intermetallic compound composed of Fe, Al and Zn may be formed, and a crack is liable to be produced in the intermetallic compound in itself, and in addition, top dross of $Fe_2Al_5$ may be formed in the plating bath so as to cause an indentation mark or an unplating portion, whereby the appearance after the plating is deteriorated.

The reason why $(W_{Al}-W_{Fe})$ is set to be 0.07 or more to 0.30 or less is because if $(W_{Al}-W_{Fe})$ is less than 0.07, a brittle Zn—Fe alloy layer, may be formed thick at the interface between the plating layer and the steel sheet, and the plating adhesion at during working may be poor. On the other hand, if $(W_{Al}-W_{Fe})$ exceeds 0.30, a thick layer of an intermetallic compound composed of Fe, Al and Zn may be formed, and a crack is liable to be produced in the intermetallic compound in itself.

The material of the high-strength hot-dip galvanized steel sheet excellent in formability according to the present invention may be, in principle, produced through normal iron making steps of refining, steelmaking, casting, hot rolling and cold rolling, but the effects according to the present invention can be obtained even with a material produced by partially or entirely omitting these steps, as long as the conditions according to the present invention may be satisfied.

EXAMPLES

Hereinbelow, the present invention is described in more detail.

A slab having the components shown in Table 1 was heated at 1,200° C., water-cooled in a water-cooling zone, and then taken-up at the temperature shown in Table 2. The thickness of the hot-rolled sheet was set to fall in the range of 2 to 4.5 mm.

The hot-rolled sheet was pickled and then cold-rolled to have a sheet thickness of 1.2 mm after cold rolling, whereby a cold-rolled sheet was obtained. The following Table 2 shows Ra and RSm of the surface of a roll in the final stand, and the surface of a roll, which was just prior to the final stand, to be used in this operation.

Thereafter, the cold-rolled sheet was subjected to a heat treatment and a hot-dip galvanization treatment under the conditions shown in Table 2 in a continuous alloying hot-dip galvanization line, and the steel sheet was cooled at the cooling rate shown in Table 2 from the annealing temperature to a temperature of 500 to 750° C., then held at a temperature of 350 to 500° C. from 5 to 300 seconds, immersed in a galvanizing bath controlled to predetermined conditions, and subsequently cooled to room temperature. Finally, the obtained steel sheet was skin-pass rolled at a rolling reduction ratio of 0.4%. At this time, the plating weight was set to about 45 g/m² on both surfaces.

TABLE 1

| | Chemical Components (mass %) | | | | | | | | | | | | | | | | | |
|---|---|---|---|---|---|---|---|---|---|---|---|---|---|---|---|---|---|---|
| | C | Si | Mn | O | P | S | Al | N | Cr | Ni | Cu | Nb | Ti | V | B | Ca | Mg | Rem Remarks |
| A | 0.198 | 0.25 | 2.24 | 0.001 | 0.009 | 0.0032 | 0.51 | 0.0028 | 0.00 | 0.00 | 0.00 | 0.00 | 0.00 | 0.00 | 0.00 | 0.00 | 0.00 | Steel of Invention |
| B | 0.139 | 0.42 | 2.42 | 0.001 | 0.011 | 0.0029 | 0.58 | 0.0021 | 0.45 | 0.00 | 0.00 | 0.00 | 0.00 | 0.00 | 0.00 | 0.00 | 0.00 | Steel of Invention |
| C | 0.231 | 0.24 | 2.32 | 0.001 | 0.008 | 0.0024 | 0.59 | 0.0019 | 0.00 | 0.52 | 0.00 | 0.00 | 0.00 | 0.00 | 0.00 | 0.00 | 0.00 | Steel of Invention |
| D | 0.220 | 0.31 | 2.03 | 0.001 | 0.008 | 0.0022 | 0.69 | 0.0027 | 0.00 | 0.00 | 0.35 | 0.00 | 0.00 | 0.00 | 0.00 | 0.00 | 0.00 | Steel of Invention |
| E | 0.245 | 0.22 | 2.34 | 0.001 | 0.014 | 0.0019 | 0.58 | 0.0026 | 0.00 | 0.00 | 0.00 | 0.15 | 0.00 | 0.00 | 0.00 | 0.00 | 0.00 | Steel of Invention |
| F | 0.272 | 0.21 | 2.04 | 0.001 | 0.010 | 0.0042 | 0.78 | 0.0021 | 0.00 | 0.00 | 0.00 | 0.00 | 0.15 | 0.00 | 0.00 | 0.00 | 0.00 | Steel of Invention |
| G | 0.263 | 0.28 | 2.19 | 0.001 | 0.009 | 0.0039 | 0.75 | 0.0020 | 0.15 | 0.00 | 0.00 | 0.00 | 0.00 | 0.25 | 0.00 | 0.00 | 0.00 | Steel of Invention |
| H | 0.219 | 0.28 | 2.26 | 0.001 | 0.006 | 0.0035 | 0.76 | 0.0016 | 0.00 | 0.00 | 0.00 | 0.00 | 0.00 | 0.00 | 0.00 | 0.00 | 0.00 | Steel of Invention |
| I | 0.195 | 0.27 | 2.30 | 0.001 | 0.010 | 0.0036 | 0.78 | 0.0013 | 0.00 | 0.00 | 0.00 | 0.03 | 0.00 | 0.00 | 0.00 | 0.01 | 0.00 | Steel of Invention |
| J | 0.199 | 0.26 | 2.31 | 0.001 | 0.014 | 0.0019 | 0.74 | 0.0033 | 0.00 | 0.00 | 0.00 | 0.00 | 0.04 | 0.00 | 0.00 | 0.01 | 0.00 | Steel of Invention |
| K | 0.249 | 0.26 | 2.29 | 0.001 | 0.019 | 0.0008 | 0.76 | 0.0045 | 0.00 | 0.00 | 0.00 | 0.00 | 0.00 | 0.00 | 0.00 | 0.00 | 0.01 | Steel of Invention |
| a | <u>0.623</u> | 0.31 | 2.56 | 0.001 | 0.012 | 0.0008 | 0.78 | 0.0022 | 0.00 | 0.00 | 0.00 | 0.00 | 0.00 | 0.00 | 0.00 | 0.00 | 0.00 | Comparative Steel |
| b | <u>0.071</u> | 0.25 | 1.95 | 0.001 | 0.009 | 0.0033 | 0.82 | 0.0025 | 0.00 | 0.00 | 0.00 | 0.00 | 0.00 | 0.00 | 0.00 | 0.00 | 0.00 | Comparative Steel |
| c | 0.185 | <u>0.80</u> | 1.76 | 0.001 | 0.019 | 0.0026 | 0.75 | 0.0011 | 0.00 | 0.00 | 0.00 | 0.00 | 0.00 | 0.00 | 0.00 | 0.00 | 0.00 | Comparative Steel |
| d | 0.176 | 0.25 | <u>0.80</u> | 0.001 | 0.008 | 0.0016 | 0.69 | 0.0009 | 0.00 | 0.00 | 0.00 | 0.00 | 0.00 | 0.00 | 0.00 | 0.00 | 0.00 | Comparative Steel |
| e | 0.215 | 0.23 | 2.32 | <u>0.010</u> | 0.020 | 0.0015 | 0.70 | 0.0021 | 0.20 | 0.00 | 0.00 | 0.00 | 0.00 | 0.00 | 0.00 | 0.00 | 0.00 | Comparative Steel |
| f | 0.222 | 0.23 | 2.20 | 0.001 | <u>0.080</u> | 0.0015 | 0.70 | 0.0021 | 0.00 | 0.30 | 0.00 | 0.00 | 0.00 | 0.11 | 0.00 | 0.00 | 0.00 | Comparative Steel |
| g | 0.212 | 0.24 | 2.26 | 0.001 | 0.012 | <u>0.0200</u> | 0.70 | 0.0020 | 0.00 | 0.00 | 0.20 | 0.00 | 0.00 | 0.00 | 0.001 | 0.00 | 0.00 | Comparative Steel |
| h | 0.225 | 0.25 | 2.25 | 0.001 | 0.012 | 0.0021 | <u>4.20</u> | 0.0021 | 0.00 | 0.00 | 0.00 | 0.10 | 0.00 | 0.00 | 0.001 | 0.005 | 0.00 | Comparative Steel |
| l | 0.225 | 0.25 | 2.25 | 0.001 | 0.012 | 0.0021 | <u>0.02</u> | 0.0021 | 0.00 | 0.00 | 0.00 | 0.10 | 0.00 | 0.00 | 0.00 | 0.005 | 0.005 | Comparative Steel |

The underline represents that the value is outside the scope of the present invention.

TABLE 2-1

| | | Cold Rolling | | | | | |
|---|---|---|---|---|---|---|---|
| Steel Species | Hot Rolling Take-Up Temperature/ ° C. | Cold Rolling Reduction Ratio/% | Ra of Final Stand Roll Surface/μm | RSm of Final Stand Roll Surface/μm | Ra of Roll Surface in One Stage Before Final Stand/μm | RSm of Roll Surface in One Stage Before Final Stand/μm | Remarks |
| A | 620 | 60 | 2.4 | 134 | 2.4 | 140 | Steel of Invention |
| A | 620 | 60 | 2.2 | 101 | 2.1 | 123 | Steel of Invention |

TABLE 2-1-continued

| | | | | | | | |
|---|---|---|---|---|---|---|---|
| A | 620 | 59 | 2.4 | 102 | 2.1 | 95 | Steel of Invention |
| A | 650 | 60 | 0.05 | 3 | 0.05 | 3 | Comparative Steel |
| A | 662 | 58 | 0.05 | 1 | 0.05 | 2 | Comparative Steel |
| A | 650 | 59 | 3.3 | 101 | 2.8 | 100 | Comparative Steel |
| A | 648 | 60 | 3.2 | 109 | 3.1 | 105 | Comparative Steel |
| A | 598 | 61 | 0.2 | 251 | 0.5 | 266 | Steel of Invention |
| A | 675 | 62 | 1.3 | 211 | 1.4 | 235 | Steel of Invention |
| A | 653 | 60 | 2.1 | 10 | 2.0 | 29 | Steel of Invention |
| A | 620 | 58 | 0.8 | 589 | 0.9 | 556 | Steel of Invention |
| A | 650 | 59 | 0.9 | 702 | 0.9 | 678 | Steel of Invention |
| A | 650 | 60 | 8.5 | 223 | 7.2 | 253 | Comparative Steel |
| A | 650 | 60 | 2.2 | 103 | 2.2 | 90 | Steel of Invention |
| A | 652 | 59 | 2.6 | 109 | 2.4 | 102 | Steel of Invention |
| A | 654 | 60 | 1.5 | 98 | 1.5 | 96 | Steel of Invention |
| A | 652 | 61 | 1.8 | 261 | 1.7 | 271 | Steel of Invention |
| A | 653 | 59 | 2.9 | 162 | 3.4 | 152 | Steel of Invention |
| B | 630 | 60 | 4.5 | 259 | 4.3 | 270 | Steel of Invention |
| C | 620 | 59 | 6.0 | 235 | 5.7 | 251 | Steel of Invention |
| D | 600 | 59 | 3.6 | 276 | 3.5 | 309 | Steel of Invention |
| E | 620 | 59 | 3.7 | 386 | 3.3 | 355 | Steel of Invention |
| F | 615 | 61 | 3.1 | 365 | 2.8 | 376 | Steel of Invention |
| G | 600 | 58 | 1.0 | 457 | 1.0 | 414 | Steel of Invention |
| H | 620 | 62 | 3.7 | 288 | 4.4 | 277 | Steel of Invention |
| I | 620 | 60 | 3.9 | 257 | 3.8 | 247 | Steel of Invention |
| J | 640 | 59 | 3.9 | 724 | 4.3 | 793 | Steel of Invention |
| K | 670 | 60 | 2.1 | 604 | 2.4 | 641 | Steel of Invention |

| | Annealing | | | | | |
|---|---|---|---|---|---|---|
| Steel Species | Annealing Temperature/ °C. | Holding Time of Annealing/s | Cooling Rate from Maximum Heating Temperature to 750° C./° C./s | Cooling Rate at 500 to 750° C./° C./s | Holding Time at 350 to 500° C./s | Remarks |
| A | 820 | 90 | 100 | 5 | 30 | Steel of Invention |
| A | 820 | 90 | 98 | 6 | 30 | Steel of Invention |
| A | 820 | 90 | 99 | 5 | 30 | Steel of Invention |
| A | 820 | 90 | 100 | 5 | 30 | Comparative Steel |
| A | 800 | 90 | 100 | 6 | 30 | Comparative Steel |
| A | 815 | 90 | 98 | 5 | 30 | Comparative Steel |
| A | 820 | 90 | 101 | 5 | 30 | Comparative Steel |
| A | 800 | 90 | 100 | 6 | 30 | Steel of Invention |
| A | 810 | 90 | 102 | 5 | 30 | Steel of Invention |
| A | 800 | 90 | 100 | 6 | 30 | Steel of Invention |
| A | 810 | 90 | 105 | 5 | 30 | Steel of Invention |
| A | 820 | 90 | 100 | 5 | 20 | Steel of Invention |
| A | 815 | 90 | 100 | 1.5 | 20 | Comparative Steel |
| A | 822 | 90 | 99 | 5 | 20 | Steel of Invention |
| A | 821 | 90 | 99 | 6 | 20 | Steel of Invention |
| A | 822 | 90 | 101 | 5 | 20 | Steel of Invention |
| A | 822 | 90 | 102 | 6 | 20 | Steel of Invention |
| A | 825 | 90 | 99 | 5 | 20 | Steel of Invention |
| B | 800 | 90 | 100 | 5 | 30 | Steel of Invention |
| C | 860 | 90 | 100 | 6 | 100 | Steel of Invention |
| D | 820 | 90 | 98 | 7 | 500 | Steel of Invention |
| E | 800 | 90 | 97 | 5 | 800 | Steel of Invention |
| F | 815 | 90 | 20 | 8 | 30 | Steel of Invention |
| G | 820 | 90 | 40 | 6 | 30 | Steel of Invention |
| H | 820 | 90 | 150 | 5 | 30 | Steel of Invention |
| I | 835 | 90 | 180 | 5 | 30 | Steel of Invention |
| J | 820 | 90 | 100 | 5 | 30 | Steel of Invention |
| K | 820 | 90 | 100 | 4 | 30 | Steel of Invention |

| | Plating | | | | | |
|---|---|---|---|---|---|---|
| Steel Species | (Immersion Sheet Temperature) - (Plating Bath Temperature/° C. | $\log(P_{H2O}/P_{H2})$ | Nitrogen Content/% | $W_{Fe}$/% | $(W_{Al} - W_{Fe})$/% | Remarks |
| A | 10 | −3.5 | 97 | 0.03 | 0.12 | Steel of Invention |
| A | 30 | −3.5 | 97 | 0.03 | 0.10 | Steel of Invention |
| A | 40 | −3.5 | 97 | 0.03 | 0.08 | Steel of Invention |
| A | 10 | −3.5 | 97 | 0.03 | 0.05 | Comparative Steel |
| A | 10 | −3.5 | 97 | 0.03 | 0.35 | Comparative Steel |
| A | −50 | −3.5 | 97 | 0.03 | 0.05 | Comparative Steel |
| A | −30 | −3.5 | 97 | 0.03 | 0.05 | Comparative Steel |
| A | 10 | −3.5 | 97 | 0.03 | 0.12 | Steel of Invention |
| A | 10 | −3.5 | 97 | 0.03 | 0.12 | Steel of Invention |
| A | 10 | −3.5 | 97 | 0.03 | 0.10 | Steel of Invention |
| A | 10 | −3.5 | 97 | 0.03 | 0.10 | Steel of Invention |
| A | 10 | −3.5 | 97 | 0.03 | 0.10 | Comparative Steel |

TABLE 2-1-continued

| | | | | | | |
|---|---|---|---|---|---|---|
| A | 10 | −3.5 | 97 | 0.03 | 0.10 | Steel of Invention |
| A | 10 | −3.5 | 97 | 0.03 | 0.07 | Steel of Invention |
| A | 10 | −3.5 | 97 | 0.03 | 0.12 | Steel of Invention |
| A | 10 | −3.5 | 97 | 0.03 | 0.11 | Steel of Invention |
| A | 10 | −3.5 | 97 | 0.03 | 0.11 | Steel of Invention |
| B | 10 | −3.5 | 97 | 0.03 | 0.12 | Steel of Invention |
| C | 10 | −3.5 | 97 | 0.03 | 0.12 | Steel of Invention |
| D | 10 | −3.5 | 97 | 0.03 | 0.12 | Steel of Invention |
| E | 10 | −3.5 | 97 | 0.03 | 0.12 | Steel of Invention |
| F | 10 | −4.5 | 97 | 0.03 | 0.12 | Steel of Invention |
| G | 10 | −4.5 | 97 | 0.03 | 0.12 | Steel of Invention |
| H | −20 | −2.5 | 97 | 0.03 | 0.12 | Steel of Invention |
| I | 10 | −2.5 | 97 | 0.03 | 0.12 | Steel of Invention |
| J | 10 | −3.5 | 97 | 0.03 | 0.12 | Steel of Invention |
| K | 10 | −3.5 | 97 | 0.03 | 0.12 | Steel of Invention |

| Steel Species | Underlying Steel Sheet Structure | | | | | Tensile Strength/ MPa | Coating Profile | | Underlying Steel Sheet Surface | | Formability | Remarks |
| | F/% | B/% | Retained γ/% | M/% | P/% | | Thickness of Intermetallic Compound/μm | Particle Diameter of Intermetallic Compound/μm | Ra/ μm | RSm/ μm | | |
|---|---|---|---|---|---|---|---|---|---|---|---|---|
| A | 20 | 49 | 19 | 12 | 0 | 1056 | 0.5 | 0.15 | 0.5 | 30 | A | Steel of Invention |
| A | 15 | 54 | 19 | 12 | 0 | 1055 | 1.4 | 0.23 | 0.5 | 25 | B | Steel of Invention |
| A | 10 | 57 | 20 | 13 | 0 | 1020 | 0.7 | 0.60 | 0.5 | 22 | B | Steel of Invention |
| A | 20 | 51 | 18 | 11 | 0 | 980 | 2.1 | 0.10 | 0.05 | 4 | D | Comparative Steel |
| A | 18 | 50 | 18 | 14 | 0 | 998 | 1.2 | 1.10 | 0.05 | 2 | D | Comparative Steel |
| A | 16 | 54 | 17 | 12 | 1 | 1000 | 2.1 | 1.20 | 0.7 | 22 | D | Comparative Steel |
| A | 18 | 54 | 16 | 12 | 0 | 1001 | 2.6 | 1.50 | 0.7 | 22 | D | Comparative Steel |
| A | 17 | 48 | 20 | 15 | 0 | 980 | 0.3 | 0.35 | 0.1 | 58 | B | Steel of Invention |
| A | 15 | 56 | 15 | 12 | 2 | 995 | 0.8 | 0.20 | 0.3 | 52 | A | Steel of Invention |
| A | 12 | 60 | 15 | 12 | 1 | 1075 | 0.6 | 0.23 | 0.5 | 6 | A | Steel of Invention |
| A | 12 | 56 | 20 | 12 | 0 | 1020 | 0.8 | 0.42 | 0.3 | 120 | A | Steel of Invention |
| A | 12 | 55 | 21 | 12 | 0 | 995 | 0.6 | 0.25 | 0.3 | 150 | A | Steel of Invention |
| A | 52 | 7 | 5 | 1 | 35 | 605 | 0.6 | 0.10 | 1.8 | 52 | D | Comparative Steel |
| A | 15 | 55 | 18 | 12 | 0 | 989 | 0.6 | 0.25 | 0.5 | 22 | A | Steel of Invention |
| A | 15 | 62 | 10 | 12 | 1 | 980 | 0.10 | 0.01 | 0.6 | 23 | C | Steel of Invention |
| A | 12 | 64 | 12 | 11 | 1 | 998 | 0.5 | 0.15 | 0.3 | 20 | A | Steel of Invention |
| A | 11 | 64 | 15 | 10 | 0 | 989 | 0.5 | 0.23 | 0.4 | 60 | A | Steel of Invention |
| A | 12 | 66 | 12 | 9 | 1 | 999 | 1.1 | 0.90 | 0.7 | 35 | C | Steel of Invention |
| B | 12 | 61 | 15 | 12 | 0 | 995 | 0.8 | 0.12 | 0.9 | 58 | A | Steel of Invention |
| C | 10 | 51 | 19 | 20 | 0 | 1010 | 1.1 | 0.70 | 1.2 | 56 | B | Steel of Invention |
| D | 11 | 58 | 19 | 12 | 0 | 1000 | 0.6 | 0.32 | 0.8 | 69 | A | Steel of Invention |
| E | 10 | 57 | 21 | 12 | 0 | 995 | 0.2 | 0.22 | 0.8 | 78 | B | Steel of Invention |
| F | 15 | 58 | 12 | 15 | 0 | 1015 | 0.3 | 0.15 | 0.7 | 89 | B | Steel of Invention |
| G | 12 | 57 | 18 | 13 | 0 | 1003 | 1.6 | 0.87 | 0.2 | 98 | C | Steel of Invention |
| H | 12 | 66 | 10 | 12 | 0 | 1105 | 1.3 | 0.52 | 0.9 | 58 | B | Steel of Invention |
| I | 12 | 55 | 18 | 15 | 0 | 995 | 1.8 | 0.65 | 0.8 | 52 | C | Steel of Invention |
| J | 12 | 56 | 17 | 12 | 3 | 1035 | 1.1 | 0.20 | 0.9 | 180 | B | Steel of Invention |
| K | 12 | 38 | 16 | 12 | 22 | 1023 | 1.6 | 0.40 | 0.5 | 150 | C | Steel of Invention |

The letter underlined in bold denotes outside the scope of the present invention.
F: Ferrite,
B: bainite,
γ: austenite,
M: martensite,
P: pearlite.

TABLE 2-2

| Steel Species | Hot Rolling Take-Up Temperature/ °C. | Cold Rolling | | | | | Remarks |
| | | Cold Rolling Reduction Ratio/% | Ra of Final Stand Roll Surface/μm | RSm of Final Stand Roll Surface/μm | Ra of Roll Surface in One Stage Before Final Stand/μm | RSm of Roll Surface in One Stage Before Final Stand/μm | |
|---|---|---|---|---|---|---|---|
| A | 623 | 60 | 1.2 | 109 | 1.3 | 109 | Steel of Invention |
| A | 615 | 59 | 2.7 | 433 | 2.8 | 483 | Steel of Invention |
| A | 630 | 58 | 3.7 | 883 | 3.3 | 786 | Steel of Invention |
| A | 620 | 59 | 1.4 | 736 | 1.3 | 771 | Steel of Invention |
| A | 600 | 60 | 4.4 | 280 | 4.3 | 240 | Steel of Invention |
| A | 620 | 62 | 5.0 | 1096 | 5.6 | 1026 | Steel of Invention |
| A | 615 | 59 | 5.9 | 143 | 5.3 | 141 | Steel of Invention |
| A | 600 | 60 | 2.3 | 946 | 2.1 | 988 | Steel of Invention |

TABLE 2-2-continued

| | | | | | | | |
|---|---|---|---|---|---|---|---|
| A | 620 | 65 | 5.6 | 660 | 5.3 | 645 | Steel of Invention |
| A | 625 | 59 | 7.3 | 568 | 7.7 | 645 | Steel of Invention |
| A | 635 | 60 | 3.6 | 1140 | 3.6 | 1002 | Steel of Invention |
| A | 642 | 62 | 7.0 | 1114 | 7.4 | 1220 | Steel of Invention |
| A | 625 | 59 | <u>10.0</u> | 858 | <u>10.9</u> | 844 | Comparative Steel |
| A | 612 | 59 | 2.9 | <u>1578</u> | 3.0 | <u>1487</u> | Comparative Steel |
| A | 632 | 65 | <u>9.9</u> | <u>1412</u> | <u>10.4</u> | <u>1528</u> | Comparative Steel |
| A | 632 | 58 | <u>11.6</u> | 1110 | <u>10.0</u> | 1028 | Comparative Steel |
| A | 652 | 61 | 7.4 | <u>1618</u> | 7.8 | <u>1395</u> | Comparative Steel |
| A | 633 | 61 | <u>10.3</u> | 239 | <u>10.9</u> | 227 | Comparative Steel |
| a | <u>720</u> | 60 | 3.6 | 258 | 3.7 | 228 | Comparative Steel |
| b | 685 | 59 | 3.6 | 300 | 3.6 | 262 | Comparative Steel |
| c | 686 | 60 | 4.3 | 311 | 4.5 | 310 | Comparative Steel |
| d | 686 | 61 | 5.0 | 272 | 4.9 | 283 | Comparative Steel |
| e | 685 | 62 | 4.2 | 272 | 4.2 | 259 | Comparative Steel |
| f | 685 | 60 | 5.6 | 281 | 5.6 | 252 | Comparative Steel |
| g | 684 | 58 | 4.9 | 232 | 4.5 | 257 | Comparative Steel |
| h | 620 | 60 | 5.2 | 254 | 5.3 | 253 | Comparative Steel |
| l | 650 | 60 | <u>12.7</u> | 1226 | <u>10.8</u> | 1138 | Comparative Steel |

| | Annealing | | | | | |
|---|---|---|---|---|---|---|
| Steel Species | Annealing Temperature/°C. | Holding Time of Annealing/s | Cooling Rate from Maximum Heating Temperature to 750°C./°C./s | Cooling Rate at 500 to 750°C./°C./s | Holding Time at 350 to 500°C./s | Remarks |
| A | 815 | 90 | 101 | 5 | 20 | Steel of Invention |
| A | 821 | 90 | 99 | 4 | 30 | Steel of Invention |
| A | 822 | 90 | 102 | 6 | 30 | Steel of Invention |
| A | 821 | 90 | 100 | 50 | 30 | Steel of Invention |
| A | 822 | 90 | 95 | 100 | 20 | Steel of Invention |
| A | 823 | 90 | 98 | 150 | 20 | Steel of Invention |
| A | 825 | 90 | 100 | 6 | 20 | Steel of Invention |
| A | 821 | 90 | 99 | 5 | 20 | Steel of Invention |
| A | 800 | 90 | 99 | 5 | 20 | Steel of Invention |
| A | 822 | 90 | 101 | 6 | 20 | Steel of Invention |
| A | 800 | 90 | 102 | 7 | 20 | Steel of Invention |
| A | 823 | 90 | 99 | 5 | 30 | Steel of Invention |
| A | 820 | 90 | 100 | 5 | 30 | Comparative Steel |
| A | 811 | 90 | 100 | 6 | 30 | Comparative Steel |
| A | 835 | 90 | 98 | 5 | 30 | Comparative Steel |
| A | 823 | 90 | 97 | 5 | 30 | Comparative Steel |
| A | 832 | 90 | 101 | 6 | 30 | Comparative Steel |
| A | 812 | 90 | 100 | 5 | 30 | Comparative Steel |
| a | 820 | 90 | 100 | 7 | 30 | Comparative Steel |
| b | <u>730</u> | 90 | 98 | <u>300</u> | 30 | Comparative Steel |
| c | 800 | 90 | 100 | 6 | 30 | Comparative Steel |
| d | 920 | 90 | 99 | 2 | 30 | Comparative Steel |
| e | 800 | 90 | 98 | 5 | 30 | Comparative Steel |
| f | 800 | 90 | 100 | 5 | <u>5</u> | Comparative Steel |
| g | 800 | 90 | 100 | 5 | <u>1500</u> | Comparative Steel |
| h | 810 | 90 | 101 | 5 | 30 | Comparative Steel |
| l | 790 | 90 | 100 | 7 | 30 | Comparative Steel |

| | Plating | | | | | |
|---|---|---|---|---|---|---|
| Steel Species | (Immersion Sheet Temperature) - (Plating Bath Temperature/°C. | $\log(P_{H2O}/P_{H2})$ | Nitrogen Content/% | $W_{Fe}$/% | $(W_{Al} - W_{Fe})$/% | Remarks |
| A | 10 | −3.5 | 97 | 0.03 | 0.10 | Steel of Invention |
| A | 10 | −3.5 | 97 | 0.03 | 0.11 | Steel of Invention |
| A | 10 | −3.5 | 97 | 0.03 | 0.11 | Steel of Invention |
| A | 10 | −3.5 | 97 | 0.03 | 0.12 | Steel of Invention |
| A | 10 | −3.5 | 97 | 0.03 | 0.10 | Steel of Invention |
| A | 10 | −3.5 | 97 | 0.03 | 0.10 | Steel of Invention |
| A | 10 | −3.5 | 97 | 0.03 | 0.10 | Steel of Invention |
| A | 10 | −3.5 | 97 | 0.03 | 0.10 | Steel of Invention |
| A | 10 | −3.5 | 97 | 0.03 | 0.11 | Steel of Invention |
| A | 10 | −3.5 | 97 | 0.03 | 0.12 | Steel of Invention |
| A | 10 | −3.5 | 97 | 0.03 | 0.11 | Steel of Invention |
| A | 10 | −3.5 | 97 | 0.04 | 0.11 | Steel of Invention |
| A | 10 | −3.5 | 97 | 0.02 | 0.12 | Comparative Steel |
| A | 10 | −3.5 | 97 | 0.015 | 0.20 | Comparative Steel |
| A | 10 | −3.5 | 97 | 0.03 | 0.25 | Comparative Steel |
| A | 10 | −3.5 | 97 | 0.03 | 0.12 | Comparative Steel |
| A | 10 | −3.5 | 97 | 0.03 | 0.12 | Comparative Steel |
| A | 10 | −3.5 | 97 | 0.03 | 0.12 | Comparative Steel |
| a | 10 | −3.5 | 97 | <u>0.005</u> | 0.12 | Comparative Steel |
| b | 10 | −3.5 | 97 | 0.03 | 0.10 | Comparative Steel |
| c | <u>60</u> | −3.5 | 97 | 0.03 | 0.10 | Comparative Steel |

TABLE 2-2-continued

| | | | | | | | | |
|---|---|---|---|---|---|---|---|---|
| d | 10 | | −5.5 | 97 | 0.03 | 0.10 | | Comparative Steel |
| e | 10 | | −1 | 97 | 0.03 | 0.10 | | Comparative Steel |
| f | 10 | | −3.5 | 90 | 0.03 | 0.10 | | Comparative Steel |
| g | 10 | | −3.5 | 97 | 0.06 | 0.10 | | Comparative Steel |
| h | 10 | | −3.5 | 90 | 0.03 | 0.10 | | Comparative Steel |
| l | 10 | | −3.5 | 97 | 0.03 | 0.32 | | Comparative Steel |

| Steel Species | Underlying Steel Sheet Structure | | | | | Tensile Strength/ MPa | Coating Profile | | Underlying Steel Sheet Surface | | Formability | Remarks |
| | F/% | B/% | Retained γ/% | M/% | P/% | | Thickness of Intermetallic Compound/μm | Particle Diameter of Intermetallic Compound/μm | Ra/ μm | RSm/ μm | | |
|---|---|---|---|---|---|---|---|---|---|---|---|---|
| A | 15 | 61 | 12 | 11 | 1 | 1050 | 0.5 | 0.35 | 0.3 | 25 | A | Steel of Invention |
| A | 12 | 58 | 18 | 12 | 0 | 989 | 0.5 | 0.44 | 0.6 | 100 | A | Steel of Invention |
| A | 11 | 41 | 35 | 12 | 1 | 980 | 0.5 | 0.45 | 0.8 | 180 | A | Steel of Invention |
| A | 12 | 64 | 12 | 11 | 1 | 1000 | 0.6 | 0.42 | 0.3 | 175 | A | Steel of Invention |
| A | 12 | 63 | 15 | 10 | 0 | 989 | 0.5 | 0.43 | 0.9 | 56 | A | Steel of Invention |
| A | 10 | 68 | 12 | 9 | 1 | 999 | 0.5 | 0.32 | 1.2 | 230 | B | Steel of Invention |
| A | 15 | 58 | 15 | 12 | 0 | 998 | 0.4 | 0.42 | 1.3 | 35 | B | Steel of Invention |
| A | 35 | 26 | 19 | 20 | 0 | 1010 | 0.5 | 0.32 | 0.5 | 225 | B | Steel of Invention |
| A | 11 | 58 | 19 | 12 | 0 | 1010 | 0.7 | 0.24 | 1.2 | 150 | B | Steel of Invention |
| A | 12 | 54 | 21 | 12 | 1 | 995 | 0.5 | 0.32 | 1.8 | 140 | B | Steel of Invention |
| A | 25 | 49 | 12 | 14 | 0 | 999 | 0.5 | 0.50 | 0.8 | 280 | B | Steel of Invention |
| A | 11 | 58 | 18 | 13 | 0 | 1002 | 0.6 | 0.43 | 1.7 | 290 | B | Steel of Invention |
| A | 11 | 67 | 10 | 12 | 0 | 1105 | 0.5 | 0.41 | 2.2 | 200 | D | Comparative Steel |
| A | 10 | 7 | 70 | 13 | 0 | 1002 | 0.6 | 0.35 | 0.6 | 320 | D | Comparative Steel |
| A | 15 | 54 | 17 | 12 | 2 | 1041 | 0.5 | 0.50 | 2.3 | 315 | D | Comparative Steel |
| A | 14 | 59 | 16 | 11 | 0 | 998 | 0.4 | 0.32 | 2.5 | 250 | D | Comparative Steel |
| A | 12 | 65 | 13 | 9 | 1 | 1010 | 0.6 | 0.21 | 1.6 | 340 | D | Comparative Steel |
| A | 13 | 63 | 14 | 10 | 0 | 1020 | 0.5 | 0.44 | 2.4 | 50 | D | Comparative Steel |
| a | 16 | 34 | 14 | 36 | 0 | 557 | 0.5 | 0.12 | 0.8 | 52 | D | Comparative Steel |
| b | 52 | 39 | 9 | 0 | 0 | 585 | 0.6 | 0.30 | 0.8 | 65 | D | Comparative Steel |
| c | 52 | 36 | 0 | 0 | 12 | 520 | 0.4 | 0.20 | 0.9 | 65 | D | Comparative Steel |
| d | 42 | 50 | 0 | 0 | 8 | 985 | 1.3 | 1.10 | 1.1 | 58 | D | Comparative Steel |
| e | 41 | 19 | 15 | 0 | 25 | 658 | 0.8 | 0.23 | 1.0 | 55 | D | Comparative Steel |
| f | 43 | 22 | 15 | 0 | 20 | 690 | 0.05 | 0.23 | 1.2 | 58 | D | Comparative Steel |
| g | 45 | 14 | 18 | 0 | 23 | 682 | 0.7 | 0.005 | 1.1 | 55 | D | Comparative Steel |
| h | 8 | 45 | 0 | 35 | 12 | 1520 | 2.2 | 0.50 | 1.2 | 55 | D | Comparative Steel |
| l | 12 | 80 | 0 | 0 | 8 | 525 | 2.4 | 0.30 | 2.6 | 253 | D | Comparative Steel |

The letter underlined in bold denotes outside the scope of the present invention.
F: Ferrite,
B: bainite,
γ: austenite,
M: martensite,
P: pearlite.

In the tensile test, a JIS No. 5 test piece was sampled in the directions perpendicular and parallel to the rolling direction of the 1.2 mm-thick sheet and evaluated for tensile properties. From the obtained elongation value, the difference (ΔE1) between elongation (L-E1) when a tensile test was performed in the direction parallel to the rolling direction, and elongation (C-E1) when the tensile test was performed in the direction perpendicular to the rolling direction, was calculated. In each sample, the tensile test was performed on 5 sheets and by determining the average of the values, the tensile strength (TS) was calculated from the average value. Incidentally, with respect to the steel sheet having a large material anisotropy, the elongation value tended to vary.

As for the formability, a steel sheet cut into 40×100 mm at an arbitrary position in an arbitrary direction was bent at 120° (bending radius R=3 mm), a region of 200 μm×200 μm on the convex side surface of the bent part was observed by a scanning electron microscope at 10 portions differing from each other, and evaluation was made according to the following criteria by counting, out of 10 portions, the number of portions where a crack was observed. "○," "□," and "Δ" were Example, and "×" was Comparative Example.

○: A crack in 0 portion (pass)
□: A crack in 1 to 2 portions (pass)
Δ: A crack in 3 to 5 portions (pass)
×: A crack in 6 to 10 portions (fail)

INDUSTRIAL APPLICABILITY

According to the present invention, a high-strength hot-dip galvanized steel sheet excellent in formability may be provided. The production of the high-strength hot-dip galvanized steel sheet may be relatively easy and can be performed stably. Therefore, the high-strength hot-dip galvanized steel sheet according to the present invention may be optimal particularly as a steel sheet for automobiles pursuing weight reduction in recent years, and its industrial value may be remarkably high.

The invention claimed is:
1. A hot-dip galvanized steel sheet, comprising an underlying steel sheet comprising, in mass %,
C: from 0.10 to 0.4%,
Si: from 0.01 to 0.5%,
Mn: from 1.0 to 3.0%,
O: 0.006% or less,

P: 0.04% or less,
S: 0.01% or less,
Al: from 0.1 to 3.0%, and
N: 0.01% or less, with the balance being Fe and unavoidable impurities, and alloying hot-dip galvanization is applied to the underlying steel sheet surface,
wherein the structure of the underlying steel sheet comprises, in terms of volume fraction, 40% or more of the total content of bainite and martensite, from 8 to 60% of retained austenite, and less than 40% of ferrite, and
a layer of an intermetallic compound composed of Fe, Al, Zn and unavoidable impurities is at the interface between the hot-dip galvanized layer and the underlying steel sheet, the average thickness of the intermetallic compound layer is 0.4 to 0.8 μm, and the crystal grain size of the intermetallic compound is 0.01 to 0.5 μm and
wherein the arithmetic mean roughness Ra of the underlying steel sheet surface is 0.1 to 1.0 μm and the average length RSm is 5 to 200 μm wherein said RSm is the average length of the contour curve element in the roughness curve of the surface of the underlying steel sheet,
wherein said Ra and said RSm are defined in JIS B 0601 (2001).

2. The hot-dip galvanized steel sheet according to claim 1, wherein the underlying steel sheet further comprises one member or two or more members of, in mass %,
Cr: from 0.05 to 1.0%,
Ni: from 0.05 to 1.0%,
Cu: from 0.05 to 1.0%,
Nb: from 0.005 to 0.3%,
Ti: from 0.005 to 0.3%,
V: from 0.005 to 0.5%,
B: from 0.0001 to 0.01%,
Ca: from 0.0005 to 0.04%,
Mg: from 0.0005 to 0.04%,
La: from 0.0005 to 0.04%,
Ce: from 0.0005 to 0.04%, and
Y: from 0.0005 to 0.04%.

3. A process for producing the hot-dip galvanized steel sheet according to claim 1, comprising:
heating a steel material comprising, in mass %,
heating a steel material comprising, in mass %,
C: from 0.10 to 0.4%,
Si: from 0.01 to 0.5%,
Mn: from 1.0 to 3.0%,
O: 0.006% or less,
P: 0.04% or less,
S: 0.01% or less,
Al: from 0.1 to 3.0%, and
N: 0.01% or less, with the balance being Fe and unavoidable impurities, at 1,100 to 1,300° C. and then subjecting the steel sheet to a hot rolling treatment at a finish rolling temperature of Ar3 temperature or more;
taking up the hot-rolled steel sheet at a take-up temperature of 700° C. or less and then cold-rolling the steel sheet;
annealing the cold-rolled steel sheet at a maximum heating temperature of 750 to 900° C.;
cooling the annealed steel sheet to a plating bath immersion temperature at a cooling rate of 3 to 200° C./sec in the range of 500 to 750° C. and then holding the steel sheet at 350 to 500° C. for 10 to 1,000 seconds;
performing a plating treatment by immersing the steel sheet in a hot-dip galvanizing bath having an Al concentration $W_{Al}$ and an Fe concentration $W_{Fe}$ satisfying, in mass %, the following relational expressions (1) and (2), at a steel sheet temperature ranging, on immersion in a plating bath, from a temperature 40° C. lower than the hot-dip galvanizing bath temperature to a temperature 50° C. higher than the hot-dip galvanizing bath temperature, in a nitrogen atmosphere having a nitrogen content of 95 mass% or more, in which the logarithm ($P_{H2O}/P_{H2}$) value of the ratio between hydrogen partial pressure $P_{H2}$ and water vapor partial pressure $P_{H2O}$ is from −5 to −2:

$$0.01 \leq W_{Fe} \leq 0.05 \quad (1)$$

$$0.07 \leq (W_{Al} - W_{Fe}) \leq 0.30 \quad (2)$$

on the roll surface of the final stand at the cold rolling, the arithmetic mean roughness Ra is 0.1 to 8.0 μm, and the average length RSm of the contour curve element in the roughness curve is 5 to 1,200 μm,
wherein Ar3=901−325×C+33×Si−92×(Mn+Ni/2+Cr/2+Cu/2+Mo/2),
wherein C, Si, Mn, Ni, Cr, Cu and Mo indicate the contents (mass %) of respective components and take 0 when the component is not contained.

4. The process for producing a high-strength hot-dip galvanized steel sheet according to claim 3, wherein on the surface of a roll in one stage before final stand at the cold rolling, the arithmetic mean roughness Ra is 0.1 to 8.0 μm, and the average length RSm of the contour curve element in the roughness curve is 5 to 1,200 μm.

* * * * *

UNITED STATES PATENT AND TRADEMARK OFFICE
CERTIFICATE OF CORRECTION

PATENT NO. : 10,526,690 B2
APPLICATION NO. : 14/348161
DATED : January 7, 2020
INVENTOR(S) : Shintaro Yamanaka et al.

It is certified that error appears in the above-identified patent and that said Letters Patent is hereby corrected as shown below:

In the Specification

At Column 2, Line 58:
Please remove "alloyed".

At Column 3, Line 9:
Please remove "alloying".

At Column 5, Line 4:
Please replace "alloying (or strengthening)" with --strengthening--.

At Column 5, Line 15:
Please replace "an alloying" with --a strengthening--.

At Column 6, Line 29:
Please replace "an alloying" with --a strengthening--.

At Column 6, Line 39:
Please replace "an alloying" with --a strengthening--.

At Column 6, Line 51:
Please replace "an alloying" with --a strengthening--.

At Column 6, Line 63:
Please replace "an alloying" with --a strengthening--.

At Column 7, Line 9:
Please replace "an alloying" with --a strengthening--.

Signed and Sealed this
Twenty-fifth Day of August, 2020

Andrei Iancu
*Director of the United States Patent and Trademark Office*

At Column 7, Line 22:
Please replace "an alloying" with --a strengthening--.

At Column 11, Lines 34-37:
Please remove "giving rise to a failure in keeping retained austenite to fall in the range according to the present invention and in turn, obtaining an underlying steel sheet in the scope according to the present invention, but also".

At Column 12, Lines 29-31:
Please replace "secured, failing in obtaining an underlying steel sheet within the scope according to the present invention" with --secured--.

At Column 13, Line 33:
Please replace "compound" with --compound of Fe, Al and Zn--.

At Column 15, Line 9:
Please remove "alloying".

In the Claims

In Claim 1, at Column 24, Line 62:
Please replace "hot-dip" with --high-strength hot-dip--.

In Claim 1, at Column 25, Line 5:
Please remove "alloying".

In Claim 2, at Column 25, Line 26:
Please replace "hot-dip" with --high-strength hot-dip--.

In Claim 3, at Column 25, Line 41:
Please replace "hot-dip" with --high-strength hot-dip--.